(12) United States Patent
Friedmann

(10) Patent No.: US 7,802,641 B2
(45) Date of Patent: Sep. 28, 2010

(54) WIND-POWERED, BATTERY-ENERGIZED ELECTRIC VEHICLE

(76) Inventor: John Friedmann, P.O. Box 1148, Woodstock, NY (US) 12498

( * ) Notice: Subject to any disclaimer, the term of this patent is extended or adjusted under 35 U.S.C. 154(b) by 0 days.

(21) Appl. No.: 12/029,152

(22) Filed: Feb. 11, 2008

(65) Prior Publication Data
US 2009/0200089 A1 Aug. 13, 2009

(51) Int. Cl.
*B60K 16/00* (2006.01)
(52) U.S. Cl. .................. 180/2.2; 180/2.1; 180/65.1
(58) Field of Classification Search ............ 180/2.2
See application file for complete search history.

(56) References Cited

U.S. PATENT DOCUMENTS

| | | | | |
|---|---|---|---|---|
| 2,306,639 | A * | 12/1942 | Miller | 416/180 |
| 2,941,613 | A | 6/1960 | Di Perna | |
| 3,556,239 | A | 1/1971 | Spahn | |
| 3,621,930 | A * | 11/1971 | Dutchak | 180/65.3 |
| 3,876,925 | A * | 4/1975 | Stoeckert | 322/1 |
| 4,075,545 | A * | 2/1978 | Haberer | 322/35 |
| 4,134,469 | A * | 1/1979 | Davis | 180/2.2 |
| 4,168,759 | A * | 9/1979 | Hull et al. | 180/2.2 |
| 4,179,007 | A | 12/1979 | Howe | |
| 4,254,843 | A * | 3/1981 | Han et al. | 180/165 |
| 4,314,160 | A * | 2/1982 | Boodman et al. | 290/55 |
| 4,402,378 | A * | 9/1983 | Amick | 180/210 |
| 4,424,452 | A | 1/1984 | Francis | |
| 5,280,827 | A * | 1/1994 | Taylor et al. | 180/165 |
| 5,746,283 | A | 5/1998 | Brighton | |
| 6,373,145 | B1 * | 4/2002 | Hamrick | 290/44 |
| 6,710,468 | B1 * | 3/2004 | O'Shanahan | 290/55 |
| 6,838,782 | B2 | 1/2005 | Vu | |
| 6,857,492 | B1 * | 2/2005 | Liskey et al. | 180/165 |
| 6,897,575 | B1 | 5/2005 | Yu | |
| 7,094,018 | B2 * | 8/2006 | Grubb | 415/4.3 |
| 2005/0046195 | A1 | 3/2005 | Kousoulis | |
| 2005/0098361 | A1 * | 5/2005 | Mitchell | 180/2.2 |
| 2006/0278445 | A1 * | 12/2006 | Chang | 180/2.2 |

(Continued)

FOREIGN PATENT DOCUMENTS

FR 2298476 8/1976

(Continued)

*Primary Examiner*—S. Joseph Morano
*Assistant Examiner*—Katy Meyer
(74) *Attorney, Agent, or Firm*—Joseph L. Spiegel; Heslin Rothenberg Farley & Mesiti. P.C.

(57) ABSTRACT

A vehicle has a frame with a body including a front and roof. The vehicle includes an electric motor energized by a battery pack, containing batteries, and connected to a battery charger/regulator. A driveshaft operatively connected to and driven by the motor propels the wheels of the vehicle. The vehicle further includes at least a pair of venturi effect air nozzle windstream accelerators comprising the design of the front of the vehicle, the front of the vehicle being wedge-shaped, having a sharp edge, generally horizontal and close to the surface or road upon which the vehicle travels, the front sloping backward and upward to the roof of the vehicle, thereby scooping up the horizontal headwind column of air developed upon vehicle movement. The accelerators further include at least a pair of venturi effect structures mounted on the roof, each containing a wind-electric generator, operatively connected to the battery charger/regulator.

4 Claims, 6 Drawing Sheets

U.S. PATENT DOCUMENTS

2007/0013196 A1* 1/2007 Chen .......................... 290/55
2008/0173170 A1* 7/2008 Zauner et al. ................ 92/261
2008/0202825 A1* 8/2008 Kerish ....................... 180/2.2

FOREIGN PATENT DOCUMENTS

| | | |
|---|---|---|
| FR | 2900603 | 11/2007 |
| GB | 2126963 | 1/1982 |
| GB | 2182616 | 5/1987 |
| GB | 2 215 292 | 9/1989 |
| GB | 2288642 | 10/1995 |
| JP | 58075438 | 5/1983 |
| JP | 08318876 | 12/1996 |

* cited by examiner

WIND-POWERED, BATTERY-ENERGIZED ELECTRIC VEHICLE

BACKGROUND OF THE INVENTION

1. Field of the Invention

The present invention relates to vehicles driven by electric power, and, in particular, to electric vehicles whose battery-powered electric motors are charged by energy developed from venturi effect wind-electric generators.

2. Description of the Prior Art

The prior art is replete with descriptions of electric vehicles whose batteries are charged by energy developed from wind-powered devices. Examples may be found in: Di Perna, U.S. Pat. No. 2,941,613; Spahn, U.S. Pat. No. 3,556,239; Dutchak, U.S. Pat. No. 3,621,93; Stoeckert, U.S. Pat. No. 3,876,925; Haberer, U.S. Pat. No. 4,075,545; Howe, U.S. Pat. No. 4,179,007; Boodman, et al., U.S. Pat. No. 4,314,160; Francis, U.S. Pat. No. 4,424,452; Taylor, et al., U.S. Pat. No. 5,280,827; Damron, et al., U.S. Pat. No. 5,920,127; Pena, U.S. Pat. No. 5,680,032; Brighton, U.S. Pat. No. 5,746,283; Hakala, U.S. Pat. No. 6,138,781; Limonius, U.S. Pat. Publ'n. US2003/0153178; Vu, U.S. Pat. No. 6,838,782; Liskey, et al., U.S. Pat. No. 6,857,492; Kousoulis, U.S. Pat. Publ'n. US2005/0046195; Yu, U.S. Pat No. 6,897,575; Tsatsis, U.S. Pat. Publ'n. US2006/0022632; Augusto, U.S. Pat. Publ'n. US2007/0126238; and, UK Pat. Appl'n GB 2,215,292 A.

While much has been written about wind-electric generating vehicles, to date there never has been a successfully built and demonstrated-to-work vehicle. Most of the prior art designs would not provide sufficient electricity to power a light bulb.

SUMMARY

The primary object, then, of the present invention is to provide an operable, electric vehicle whose battery powered electric motors are charged by energy developed from venturi effect enhanced wind-electric generators.

These and other objects, features and advantages are accomplished in accordance with the teachings of the present invention, one illustrative embodiment of which comprises a vehicle having a frame with a body including a front and roof. The vehicle includes an electric motor energized by a battery pack, containing batteries, and connected to a battery charger/regulator. Mechanical transmitting means operatively connected to and driven by the motor propels the wheels of the vehicle. The vehicle further includes at least a pair of venturi effect air nozzle windstream accelerators comprising the design of the front of the vehicle, the front of the vehicle being wedge-shaped, having a sharp edge, generally horizontal and close to the surface or road upon which the vehicle travels, the front sloping backward and upward to the roof of the vehicle, thereby scooping up the horizontal headwind column of air developed upon vehicle movement. The accelerators further include at least a pair of venturi effect structures mounted on the roof, each containing a wind-electric generator, operatively connected to the battery charger/regulator.

BRIEF DESCRIPTION OF THE DRAWING

Other objects, features and advantages of the present invention will be apparent from the following detailed description and accompany drawing, wherein.

DETAILED DESCRIPTION

Figure 1:
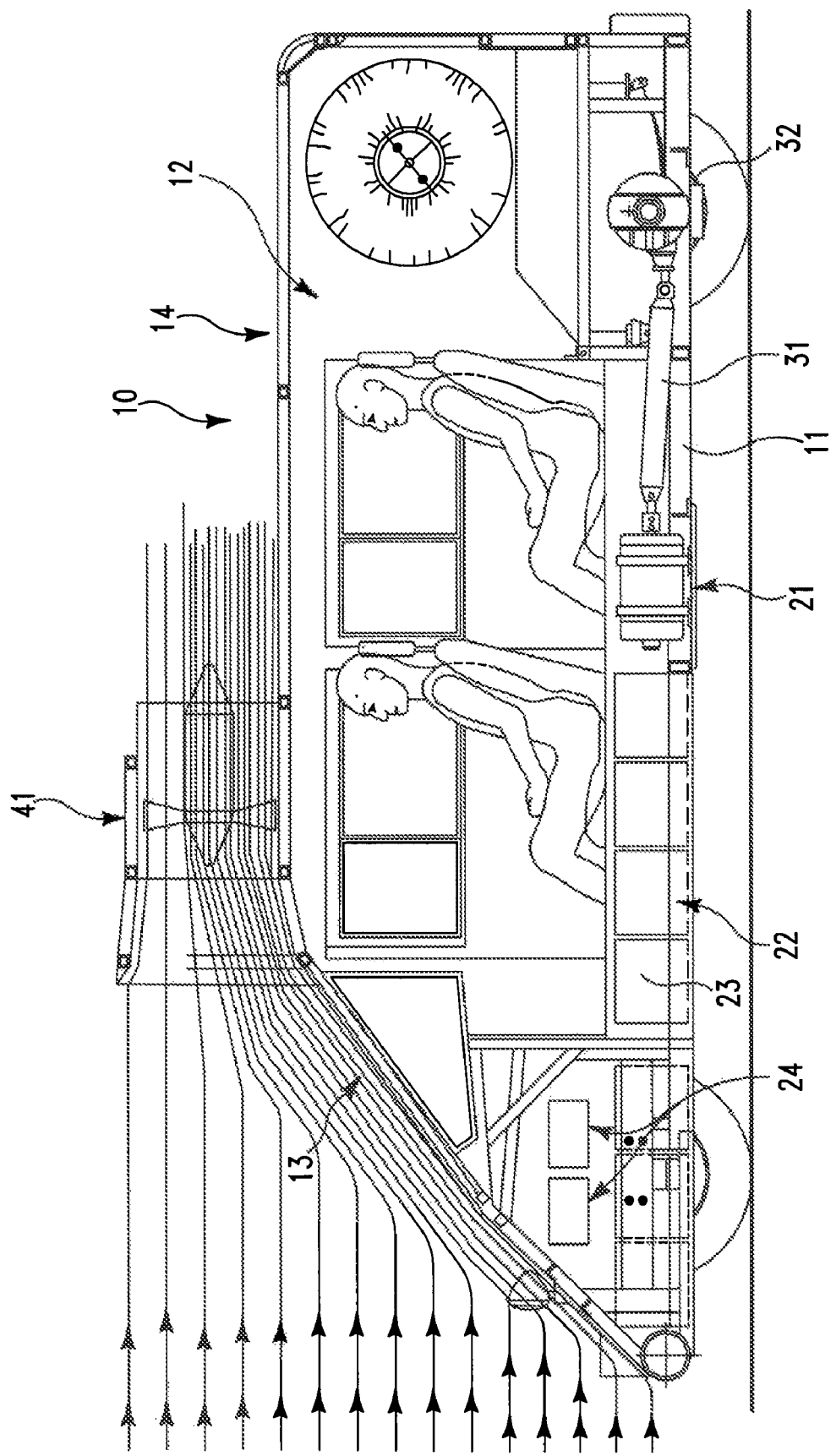
FIG. 1 is a side view, partially cut away and partially in schematic of the wind-powered, battery-energized, electric vehicle of the present invention.
Figure 2:
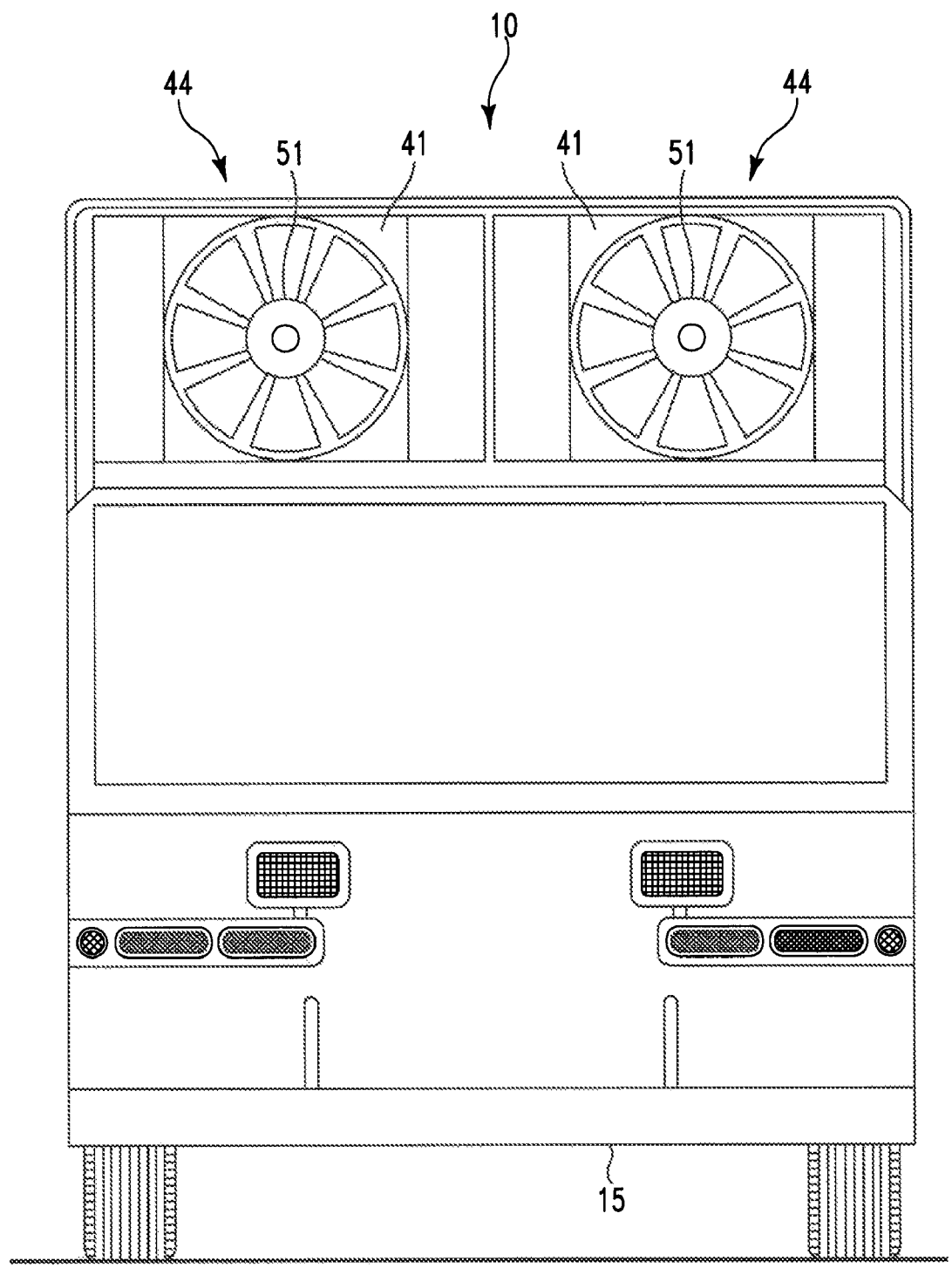
FIG. 2 is a front view of the vehicle of FIG. 1.
Figure 3:
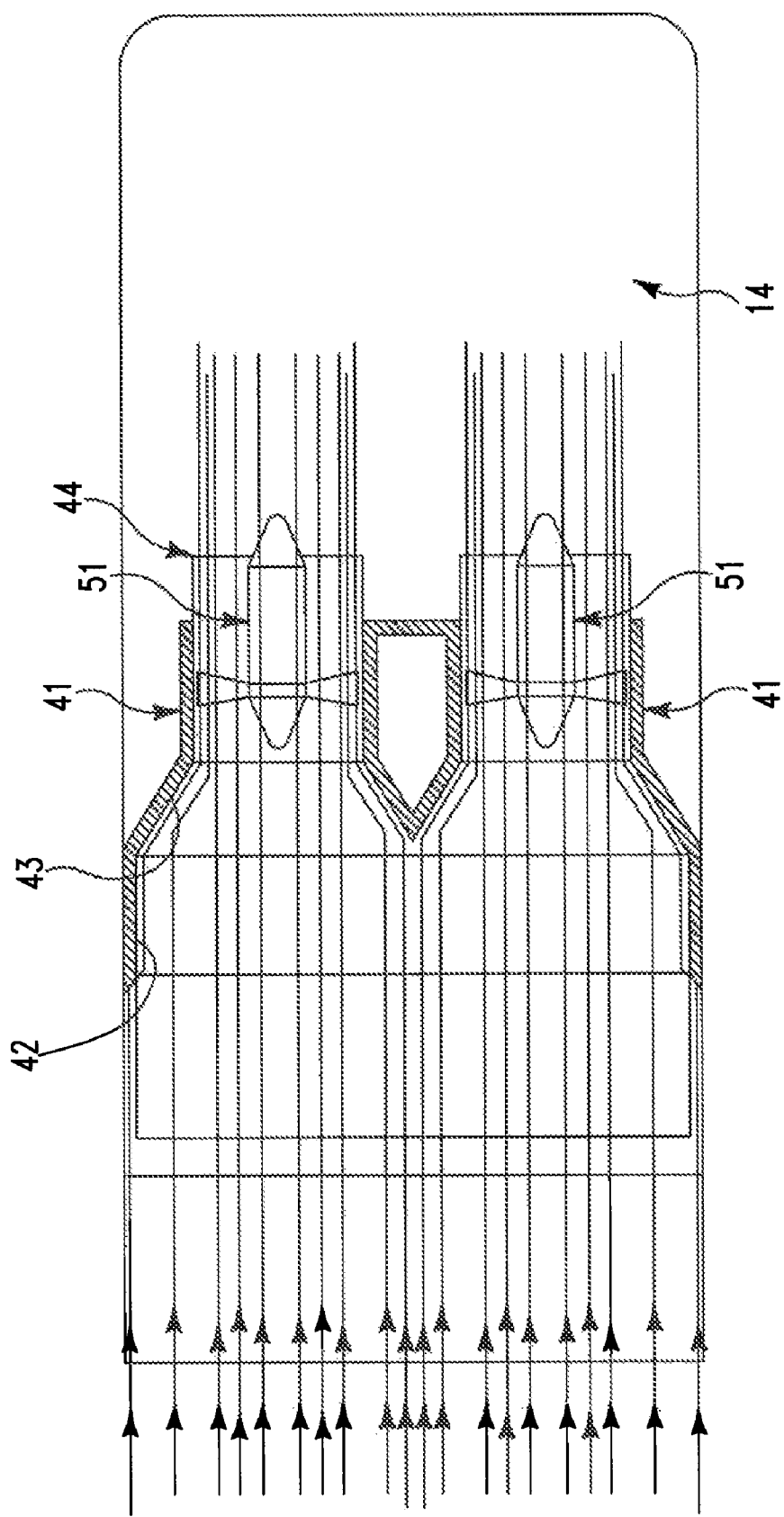
FIG. 3 is a top view, partially cut away and partially in schematic of the roof and roof-mounted venturi effect structures.

Referring now to FIGS. 1-3 of the drawing there is shown a vehicle 10 having a frame 11 with a body 12 including a front 13 and roof 14

Vehicle 10 includes an electric motor 21 energized by a battery pack 22, containing batteries 23, and with battery charger/regulators 24 interposed.

Mechanical transmitting means 31 are operatively connected to and driven by the motor 21 for propelling the wheels 32 of the vehicle 10.

The vehicle 10 further includes at least a pair of venturi effect air nozzle windstream accelerators comprising: the front 13 of the vehicle 10, to be explained in more detail hereafter; and, at least a pair of venturi effect structures 41 mounted on the roof 14, each containing a wind-electric generator 51, operatively connected to the battery charger/regulators 24.

For optimum results, the frame 11 and body 12 of the vehicle 10 should be of material that is light and energy-efficient, as, for example, aluminum. Also, designers of present modern vehicles ignore the advantage of aluminum construction to avoid rusting.

The body 12, as will be shown hereafter, is highly streamlined with a low drag, energy-efficient design.

Within vehicle 10, there are typical seats, controls and all the safety and comfort features of a modern vehicle.

An example of an electric motor 21 would be one manufactured by Advanced D.C. Motors, Inc. #FB1-4001, 144 VDC.

Battery pack 22 comprises twelve high capacity, long range 12 volt batteries 23, connected in series, as, for example, Deka, Marine, SeaMate #8A8DM, manufactured by East Penn Manufacturing Co., Inc.

Each battery charger/regulator 24, for example, manufactured by Mid-Eastern Industries of Bergenfield, N.J., takes a variable AC current output (dependent on vehicle speed), rectifies it to DC, senses temperature and amount of charge in the batteries 23 in correct, controlled, regulated manner.

In the embodiment shown, power is transmitted directly from motor 21 to wheels 32 via a driveshaft 31. The driveshaft 31 is connected directly to the differential of the rear axle drive wheels 32. The differential may be a constant ratio gearbox, with a choice of ratios.

The wedge-shaped front 13 of vehicle 10, flat and positioned horizontally, with a sharp edge 15 (FIG. 2), acts to scoop up the entire frontal column of air or windstream developed as the vehicle moves, and with a cross-section equal to the full width×height of the vehicle, and streams it, as shown in FIGS. 1 through 3, into the venturi effect structures 41. The scooping up and deflection of the cross-sectional area of the column equal to the full width and height of the vehicle body, e.g. 5 ft. 3 in.×6.0 ft. 0 in.=31.5 sq.ft. accomplishes a venturi effect that significantly accelerates the windstream velocity in a direction towards and into the venturi effect structures 41.

In a typical embodiment, the front 13 is angled at 38 degrees from the horizontal.

Referring again to FIGS. 1-3 and 5 of the drawing, at least a pair of venturi effect structures 41 are mounted on the forward portion of the roof 14 of vehicle 10. The longitudinal axes of structures 41 are substantially parallel to the longitudinal axis of vehicle 10. The vehicle 10 is shown with a pair of venturi effect structures 41, and is so described, but more than two could be mounted, so long as in parallel position, not series or otherwise.

Each structure 41 includes a forward facing chamber 42, typically 21 inches long, whose entrance may be flared outwardly, a transition section 43, typically 15 inches long and nozzle tube 44, typically 27 inches long. The structures 41 have a 1½×1½ in. rectangular aluminum tube frame with welded connections, surfaced with 1/16 thick in. sheet aluminum.

Chamber 42 acts as a collection chamber for capturing the windstream from the front 13 of vehicle 10. It has an opening area, in the embodiment depicted, of approximately 9.46 sq.ft. (5 ft. 2 in.×1 ft. 10 in.) and a depth of 1 ft. 8 in.

The chamber 42 of the structure 41 is followed by the transition section 43, typically 20 inches long. The transition section 42 tapers down and forces the windstream into a much smaller diameter round.

Optimally, the transition section 43 is tapered at an approximate angle of 38 degrees.

If the angle of taper in the transition section is too steep, it will block and back up air flow. If it is too shallow, and elongated, it will make the air passages too long, causing increased airflow impeding friction. The optimal angle of taper has been found to be 38 degrees. The same considerations apply to the design of the front 13 of the vehicle 10.

The column of air coming from the transition section 43 is constricted by the transition section 43 and directed into the nozzle tubes 44 of each structure 41. Each tube 44 is typically of 21 in. diameter.

The design of the front 13 of vehicle 10 causes the major part of windstream acceleration, before entering chamber 42. The tapered part of the collection chamber or transition section 43 adds to and completes the acceleration process.

The chamber 42 and transition section 43 squeeze down the windstream from every direction, thereby making a smooth and even acceleration of windstream into the tubes 44.

The small diameter tubes 44 are relatively short to allow quick, easy and free windstream exit that does not impede the incoming windstream. Upon reaching the end of the tube 44, air-flow is immediately released to the free air atmosphere above the rear portion of roof 14.

The chamber 42 and transition section 43 capture the windstream column with a cross-sectional area of 31.5 sq.ft. and force the air through the two nozzle tubes 44 with a total cross-sectional area of only 3.12 sq.ft., producing a venturi effect constriction ratio of approximately 10 to 1. This 10 to 1 venturi effect constriction ratio will more than triple the windstream velocity over the velocity caused by and equal to the speed of the vehicle.

Figure 5:
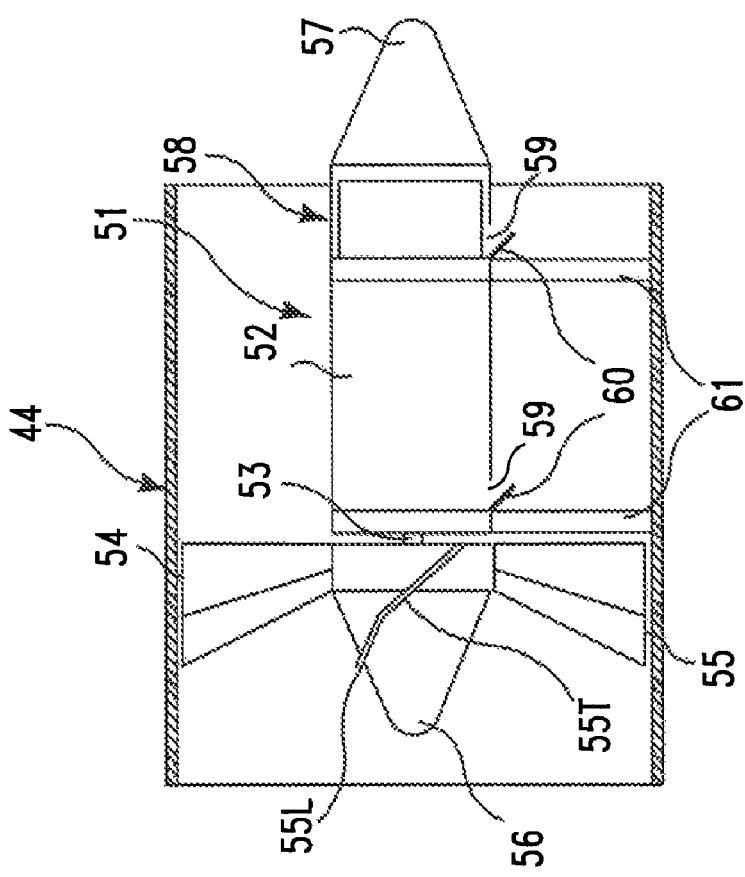
FIG. 5 is a side view, partially cut away and partially in schematic, of the wind-electric generator of FIG. 4.
Figure 4:
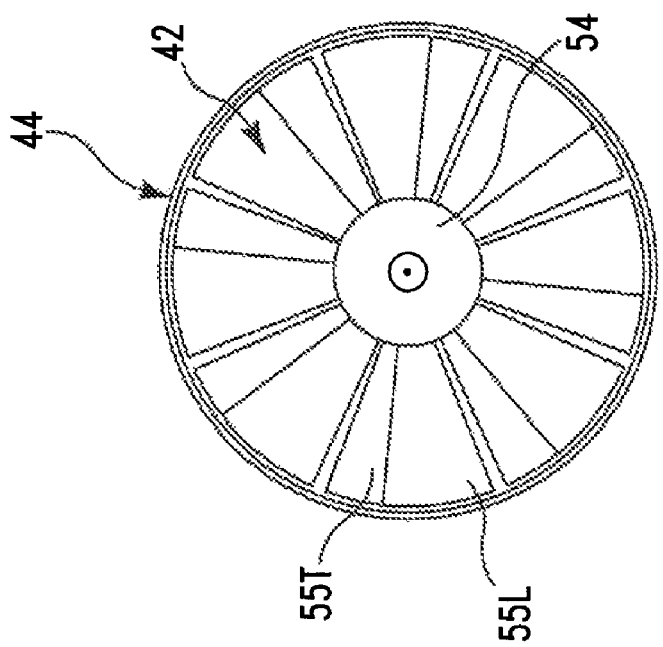
FIG. 4 is a front view of the wind-electric generator portion of one of the roof-mounted venturi effect structures.

Disposed within each of the nozzle tubes 44, shown in FIGS. 1-5, but best in FIG. 5, is a wind-electric generator 51 that includes a generator 52, for example, MSL Industries, VoltMaster #AB 60, with central shaft 53, a fan type propeller 54, typically of 20¾ in. diameter, manufactured by Dutchess Metal Fabricators, Poughkeepsie, N.Y., mounted on shaft 53, with blades 55, typically of 7⅜ inch length, and front nose cone 56 and rear cone 57 mounted on the propeller 54 and the rear of the generator 52, respectively.

An example of a generator 52 would be VoltMaster America Model AB 60 AC generator, each yielding 70 amperes @120 volts. The generator 52 is placed within nozzle tube 44 so that propeller 54 is positioned approximately 14 in. back from the entrance to the nozzle tube 44. At this location, all windstream acceleration has been accomplished and all turbulence resolved. Optimally, each generator 52 generates seven times more electricity than if the generator were mounted in a free-air setting.

As explained above, the tubes 44 are relatively short. Lengthy nozzle tubes substantially impede air-flow, reducing the power of the wind to turn the blades 55. Also, longer tubes could lead to accumulation of water from rain, collection in low spots, fester and breed Legionnaires Disease, mold and mildew.

Each propeller 54 has eight blades 55. The leading edge 55L of the blade 55 is bent at a steeper angle than the trailing edge 55T, say 52 degrees and 45 degrees. This two, or compound pitch design makes the air push harder on the blades 55, giving the propeller 54 more turning power than one with single angle pitch blades.

The propeller blades 55 fit tightly in the small diameter tubes with only a ¼ inch gap between the ends of the blades 55 and the interior wall of the tube 44 and the blade edges are in close proximity. In this way virtually ever air molecule passing into the tube 44 hits and drives the blades 55.

Additionally, all the propeller blades 55 are open to the wind by being outside the cross-section of the generator 52 so that the generator 52 does not block any portion of the windstream.

The propeller blades 55, as of aluminum, are welded to an aluminum flange that is mounted on the generator shaft 53.

The front nose cone 56 is equal to the diameter of the generator 52 and streams all the wind into the propeller blades 55.

The rear cone 57 eliminates backwash turbulence drag.

Referring to FIG. 5, the generator 52 is enclosed in a weatherproof aluminum casing 58, typically of 6 in. diameter, with heat ventilation holes 59 in the bottom protected by baffles 60. The generator 52 is heavily air-cooled by the windstream. The casing 58 protects the generator 52 from rain, snow, particulate matter, insects, etc. Unprotected ventilation slots or holes would allow rain, snow and ice into the generator 52 leading to its destruction. Each wind-electric generator 51 is supported on thin vertical posts 61.

Figure 6:
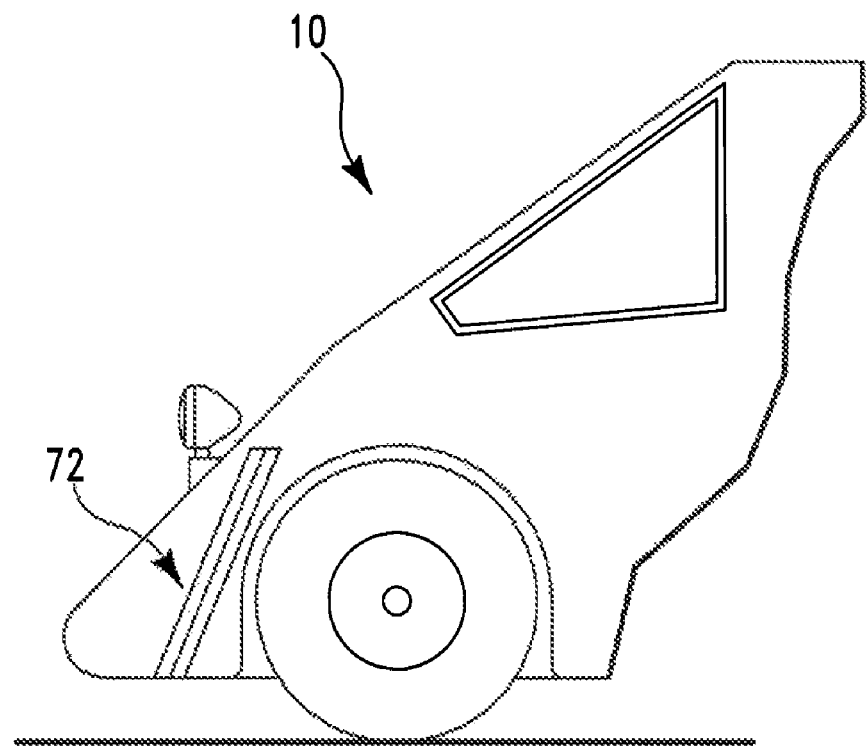
FIG. 6 is a side view, cut away, showing the wheel well drag eliminating flap along the left side of the vehicle.
Figure 7:
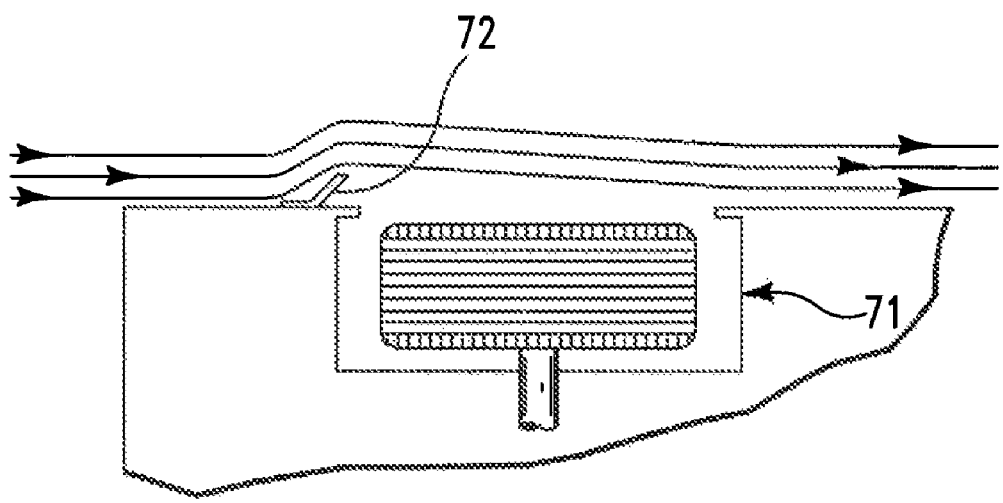
FIG. 7 is a top view, cut away and partially in schematic, illustrating the flap shown in FIG. 6; and, FIG. 8 is an electrical schematic for the wind-powered, battery-energized, electric vehicle of the present invention.

Referring to FIGS. 6 and 7, all four wheel wells 71 are provided with leading edge flaps 72 that deflect the side airstream out and away from the wheel well opening, eliminating drag. In an ordinary vehicle the wheel wells 71 cause as much as 21.4% of total body drag. The flaps 72 push the air out and away form the wheel wells 71.

With typical wheel wells, air rushes in side-facing openings, hits the back of the wheel well, causing waste of energy and body drag. The wheel well leading edge air deflecting, drag eliminating, flap 72 deflects the side windstream out and away from the wheel well opening, so very little air enters the wheel wells 71 and hits the back surface. Wheel well drag is largely eliminated and the vehicle is significantly more energy efficient.

Figure 8:
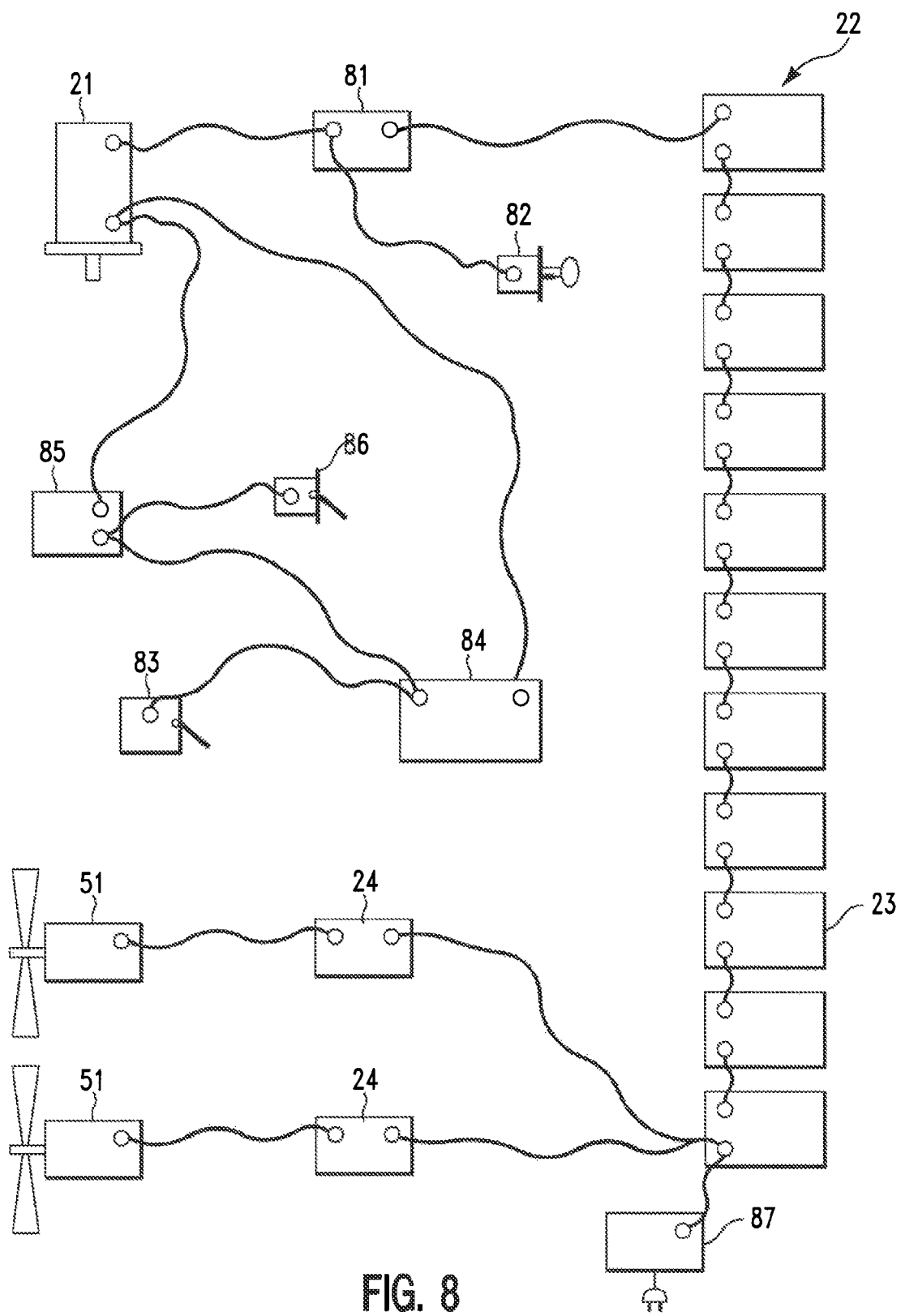

In operation and use, and referring to FIG. 8 as well, the battery pack 22 for energizing the motor 21 is connected through a main contactor 81, for example, Albright Eng. # SW-180B, the continuity of which is controlled by a keyed switch 82. An accelerator pedal 83, for example, Curtis # FP-2, is depressed and, via a motor controller 84, for example, Curtis-PMC #1231C-8601, controls energization of the motor 21 and speed of the vehicle 10. A reversing contactor set 85, for example, Albright Eng. #SW 182-B with direction switch 86 is included to obtain forward and reverse vehicle movement.

When the vehicle 10 is in forward motion, and typically at a speed greater than 20 mph, a voltage and current, controlled through the battery charger/regulator 24, charges the batteries 23 in the battery pack 22 via the generators 51.

Optionally, a stationary, supplemental battery charger 87, for example, a Zivan # NG63 battery charger is included for stationary re-charge.

The angular design to the front 13 of the vehicle 10, across its full width, scoops up and funnels down the frontal windstream column to a cross-section that is equal to the full frontal cross-section of the vehicle. This column is further constricted and forced through the venturi effect structures 41. The impingement on the blades 55 of the fan type propeller 54 drives the generator 52 through the battery charger/regulator 24 to charging of the batteries 23.

The entire power system, generators, motor, batteries, controls, etc., are, for the most part, completely available from commercial sources.

There is easy access to the generator 52, propeller 54 and blades 55 for repair and replacement purposes.

The vehicle of the present invention, through its wide adoption, will reduce dependency on foreign oil and thus the high cost of road transportation fuel, always susceptible to terrorist attack, reduce greenhouse gas emissions and health damaging air pollution.

It should be obvious that changes, additions and omissions may be made in the details and arrangement of parts without departing from the spirit and scope of the invention as hereinafter claimed.

What is claimed is:

1. Wind-powered battery-energized electric vehicle, comprising:
   a vehicle with
      a frame, and,
      a body having a front and, a roof with a forward portion;
   an electric motor within the frame;
   a battery pack within the frame containing one or more batteries, operatively connected to the motor for energizing the motor;
   a battery charger/regulator operatively connected to the battery pack;
   mechanical transmitting means within the frame operatively connected to and driven by the motor for propelling the vehicle;
   at least a pair of venturi effect air nozzle windstream accelerators designed into the vehicle, including
      the front of the vehicle being wedge-shaped, having a sharp edge, generally horizontal and close to the surface or road upon which the vehicle travels, the front sloping backward and upward towards the roof of the vehicle, thereby scooping up the horizontal headwind column of air developed upon vehicle movement,
      at least a pair of venturi effect structures mounted on the roof. each including a forward facing chamber and a small diameter nozzle tube having an interior wall through which the windstream is directed and having an unrestricted exit opening, and each containing a wind-electric generator, operatively connected to the battery charger/regulator, the wind electric generator being in close proximity to the nozzle tube exit opening;
   each wind-electric generator including a generator with a central shaft and a rear nose cone, and a fan type propeller, with front nose cone, mounted on the generator shaft, with blades, for driving the generator to generate electricity;
   the front nose cone directing the windstream into the propeller blades; and,
   the propeller blades extending outside the circumference of the generator and nose cone, close to the interior wall of the nozzle tube, having edges that are in close proximity and a compound pitch angle.

2. The vehicle of claim 1 wherein the generator is housed within an air-cooled, waterproof casing.

3. The vehicle of claim 2 wherein the generator housing has a bottom portion provided with baffled vent holes.

4. Wind-powered battery-energized electric vehicle, comprising:
   a vehicle with
      a frame, and,
      a body having a front, and, a roof with a forward portion;
   an electric motor within the frame;
   a battery pack within the frame containing one or more batteries, operatively connected to the motor for energizing the motor;
   a battery charger/regulator operatively connected to the battery pack;
   mechanical transmitting means within the frame operatively connected to and driven by the motor for propelling the vehicle;
   at least a pair of venturi effect air nozzle windstream accelerators designed into the vehicle, including
      the front of the vehicle being wedge-shaped, having a sharp edge, generally horizontal and close to the surface or road upon which the vehicle travels, the front sloping backward and upward towards the roof of the vehicle, thereby scooping up the horizontal headwind column of air developed upon vehicle movement,
      at least a pair of venturi effect structures mounted on the forward portion of the roof, with their longitudinal axes substantially parallel to the longitudinal axis of the vehicle, each having
         a forward facing chamber of uniform cross section having an air intake located where the front and roof meet, for collecting the windstream column from the vehicle front in response to vehicle movement,
         a moderately tapered transition piece through which the windstream from the collection chamber is funneled, for further squeezing down the windstream and increasing the velocity and pressure of the windstream collected,
         a small diameter nozzle tube of uniform cross section having an interior wall through which the funneled windstream is directed and having an unrestricted exit opening, and,
      a wind-electric generator positioned within the nozzle tube having
         a generator with a central shaft and a rear nose cone
         a fan type propeller, with front nose cone, mounted on the generator shaft, with blades,
         for driving the generator to generate electricity,
         the generator operatively connected to the battery charger/regulator for, in-turn, charging the battery pack in response to rotation of the blades, the impingement of air upon the blades causing rotation of same upon the vehicle's movement; and,
      wherein the front nose cone directs the windstream into the propeller blades, the propeller blades extend outside the circumference of the generator and nose cone, extend close to the interior wall of the nozzle tube, have edges that are in close proximity and have a compound pitch angle.

\* \* \* \* \*